Aug. 3, 1937.  G. A. MITCHELL  2,088,714
SOUND INSULATED MOTION PICTURE CAMERA
Original Filed May 7, 1934   11 Sheets-Sheet 1

Inventor
George A. Mitchell.
Attorney

Aug. 3, 1937.  G. A. MITCHELL  2,088,714
SOUND INSULATED MOTION PICTURE CAMERA
Original Filed May 7, 1934    11 Sheets-Sheet 2
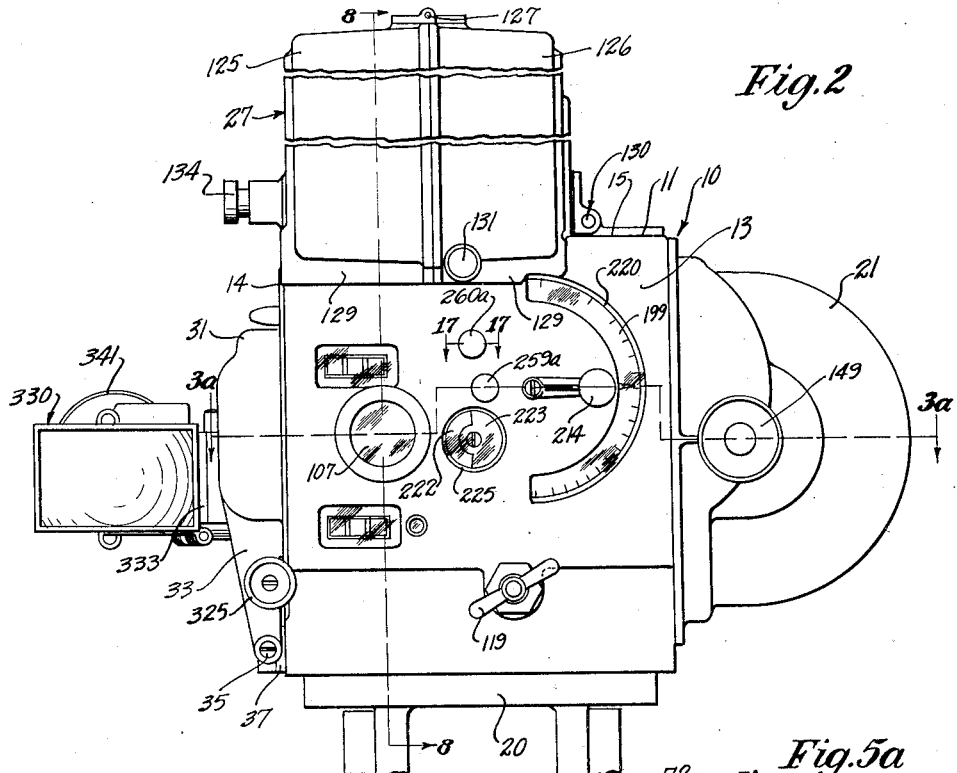
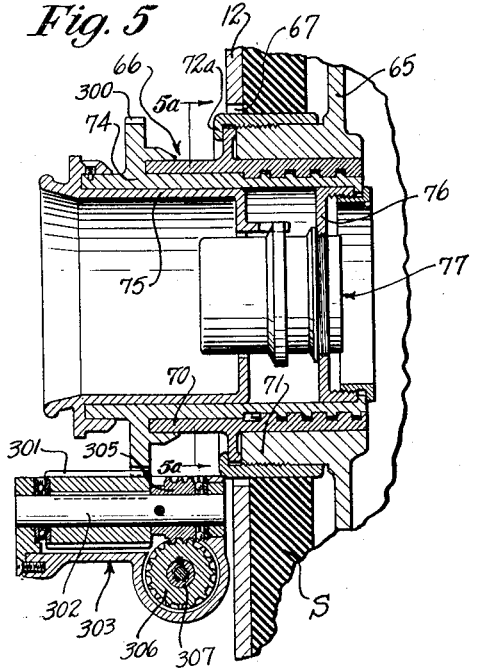
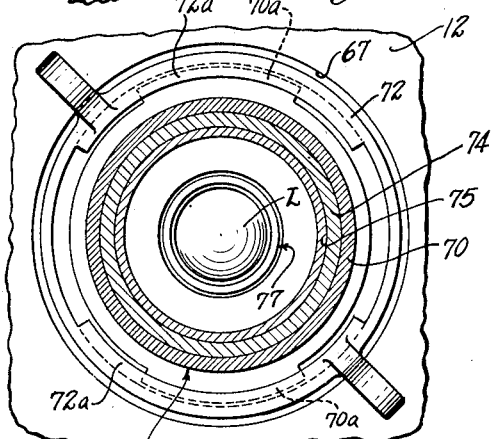
Inventor
George A. Mitchell.
Attorney.

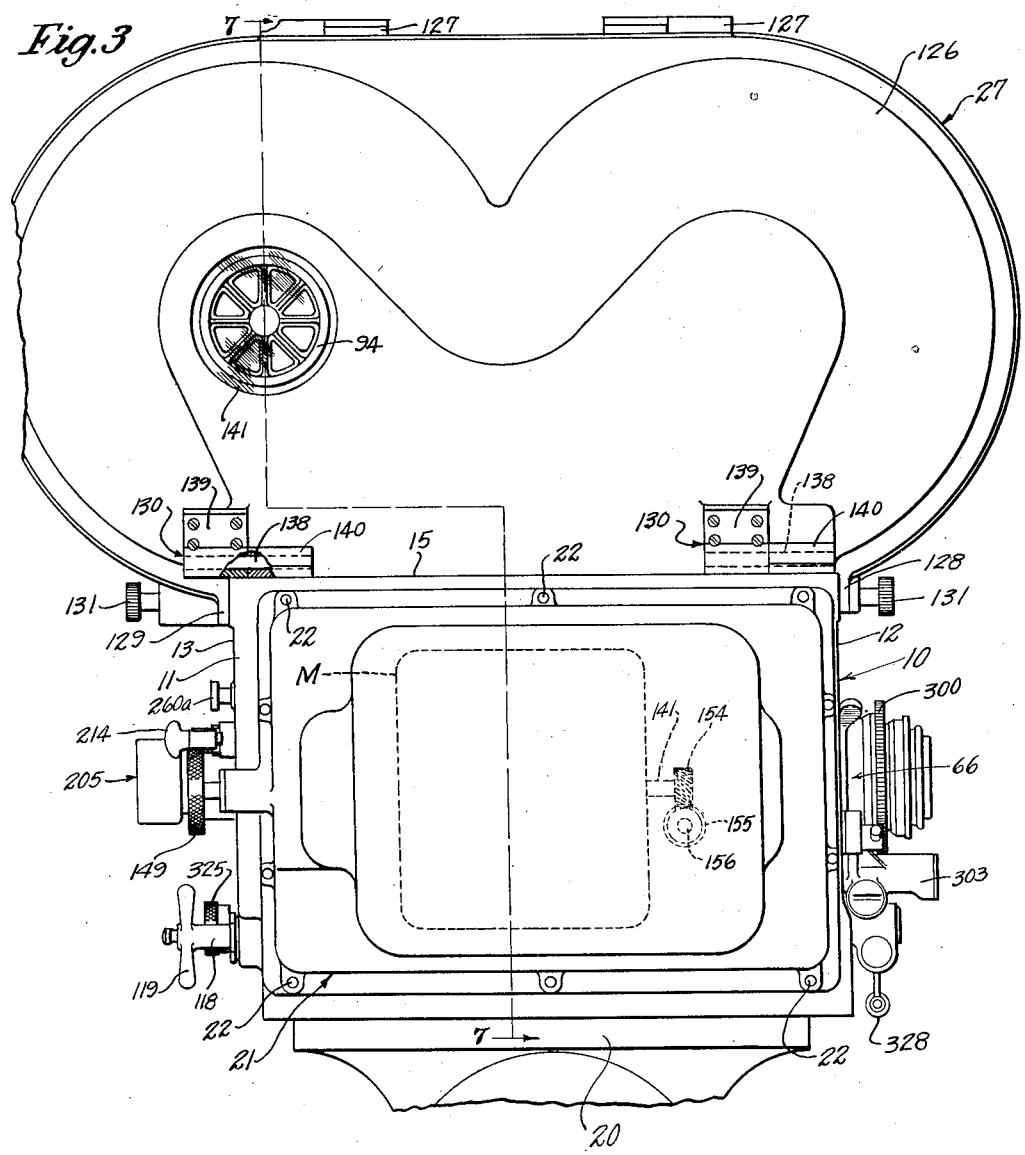

Aug. 3, 1937.   G. A. MITCHELL   2,088,714
SOUND INSULATED MOTION PICTURE CAMERA
Original Filed May 7, 1934   11 Sheets-Sheet 5

Inventor
George A. Mitchell.
Attorney.

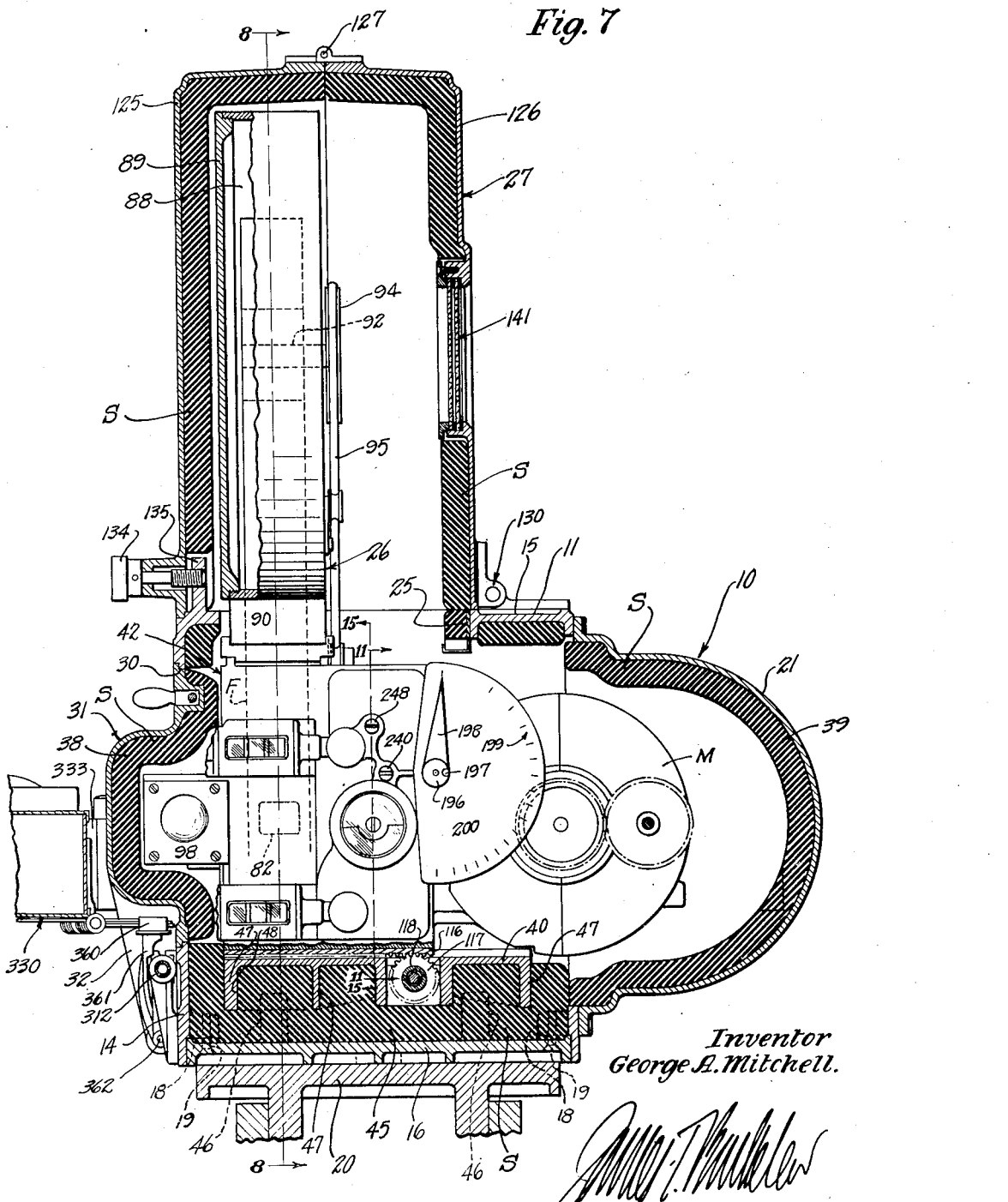

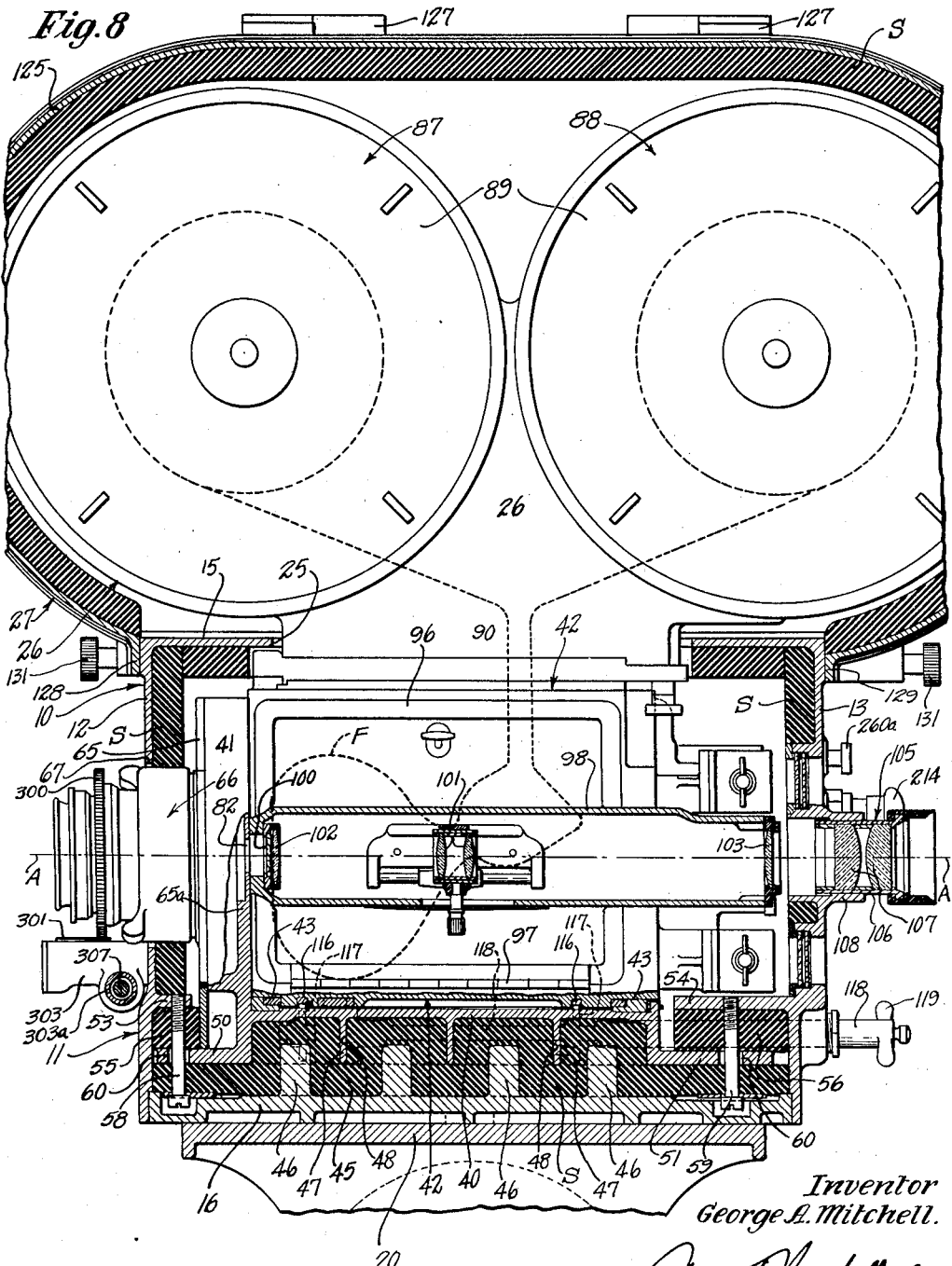

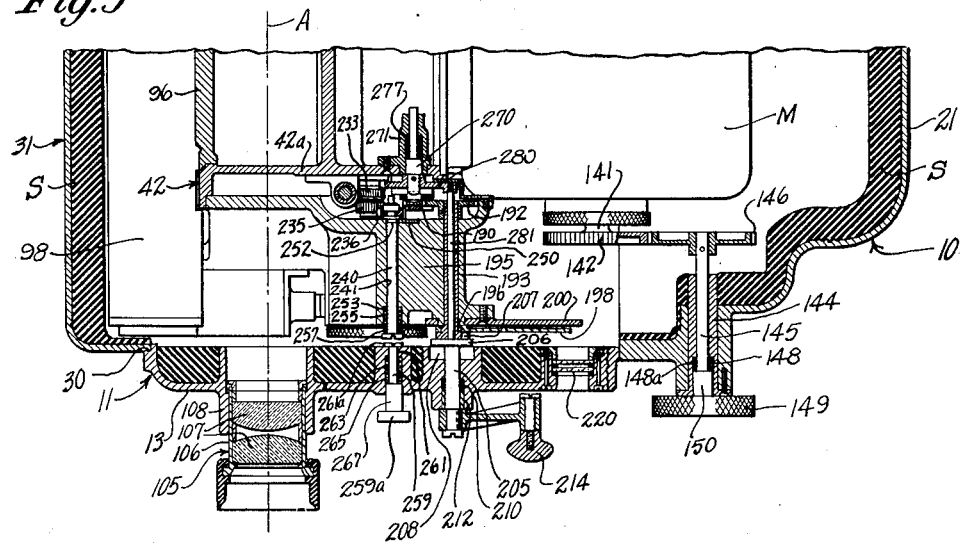
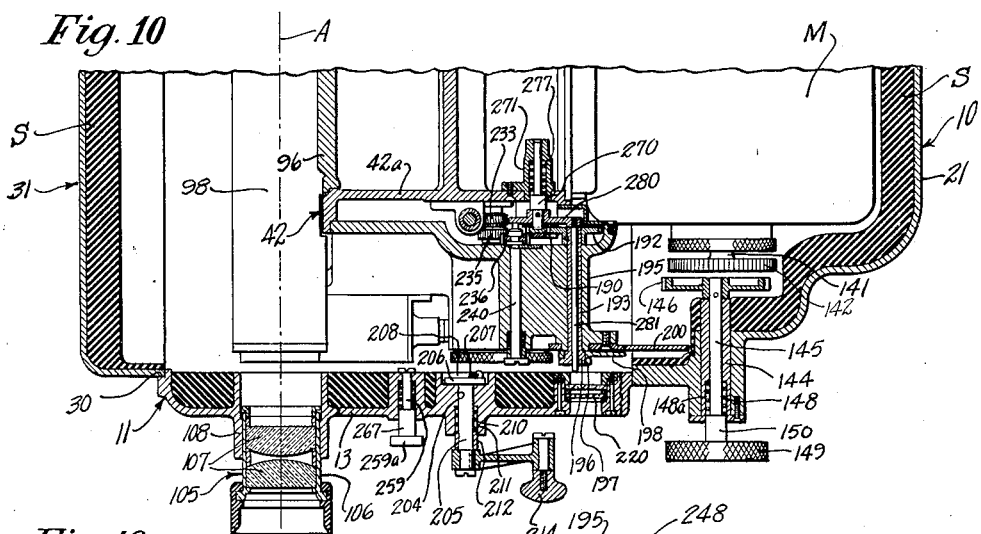
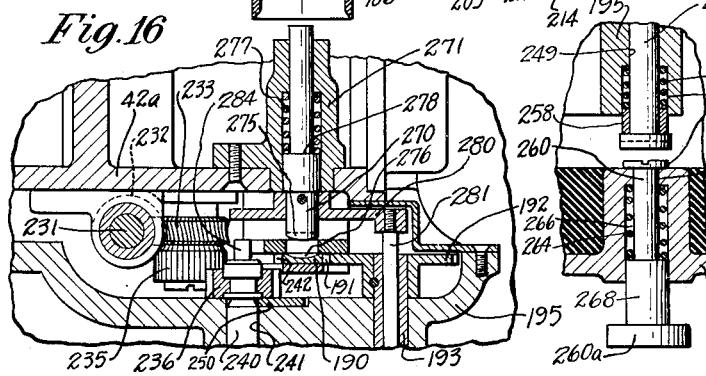

Aug. 3, 1937.   G. A. MITCHELL   2,088,714
SOUND INSULATED MOTION PICTURE CAMERA
Original Filed May 7, 1934   11 Sheets-Sheet 9
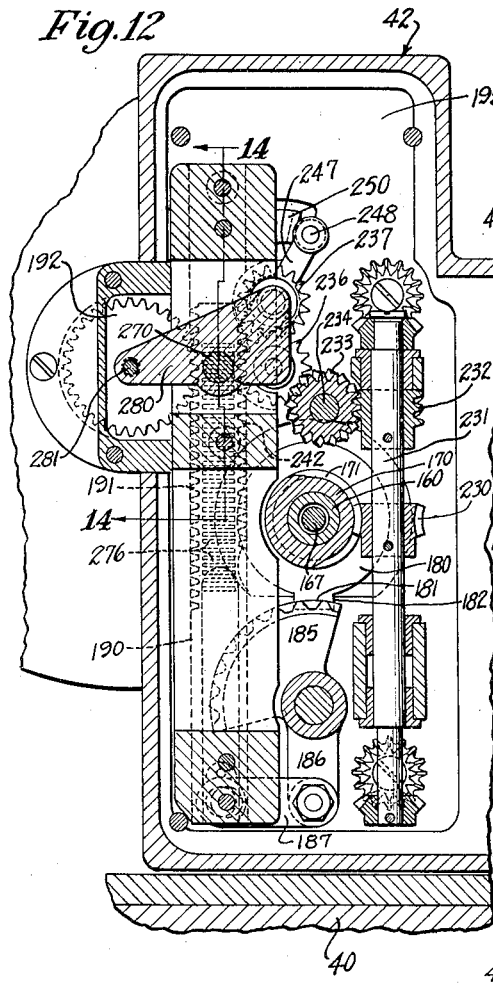
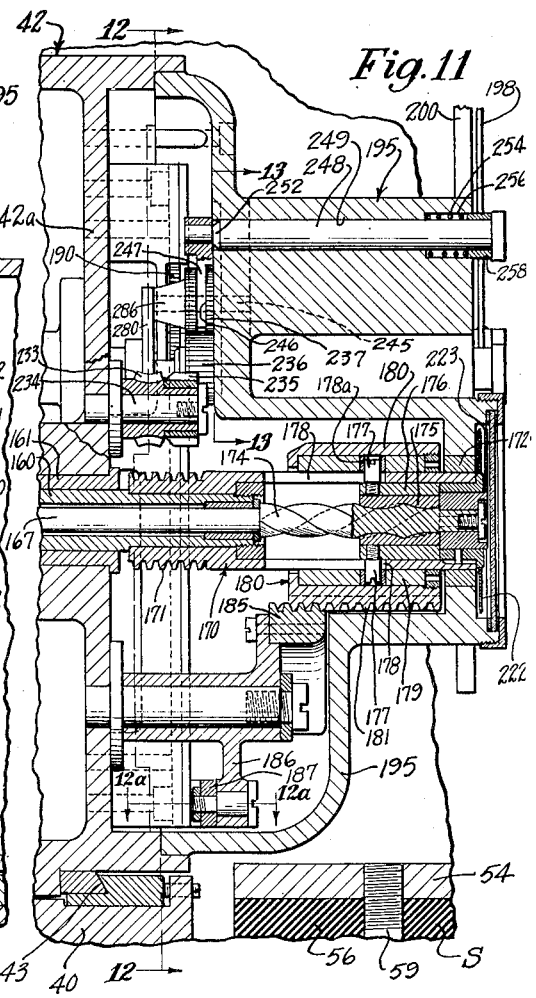
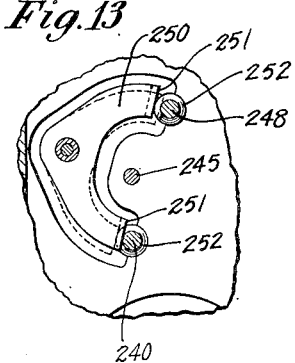
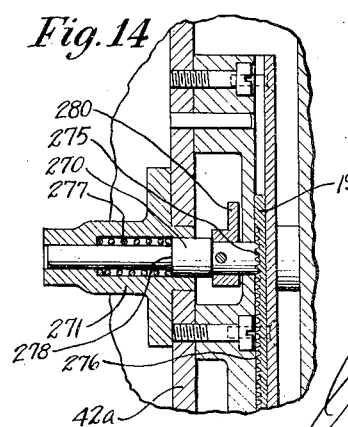
Inventor
George A. Mitchell.
Attorney.

Aug. 3, 1937.   G. A. MITCHELL   2,088,714
SOUND INSULATED MOTION PICTURE CAMERA
Original Filed May 7, 1934   11 Sheets-Sheet 10
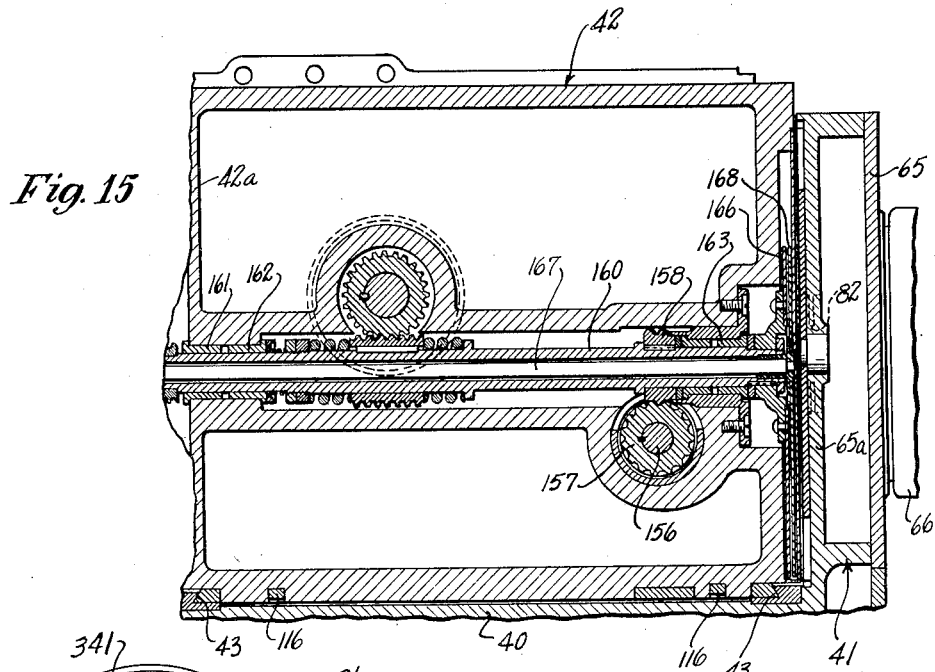
Fig. 15
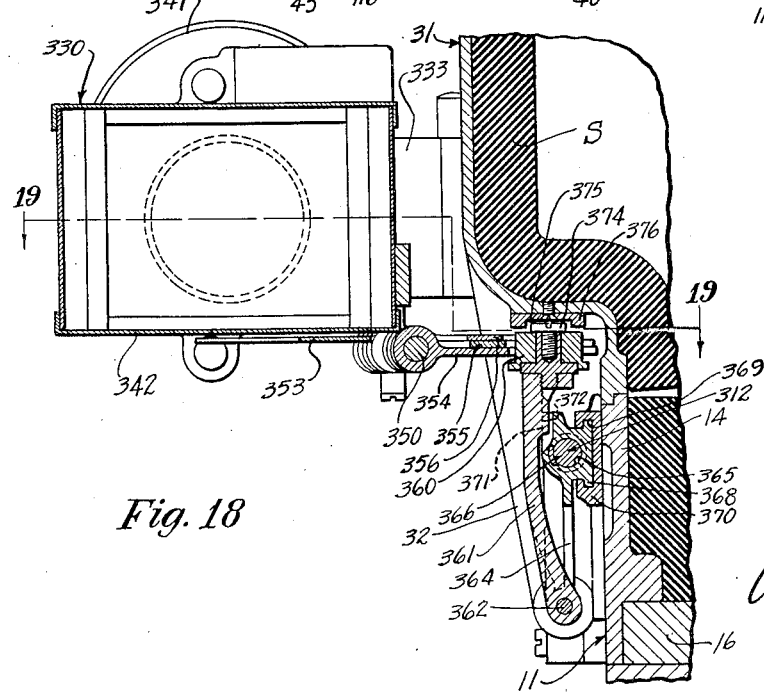
Fig. 18
Inventor
George A. Mitchell.
Attorney.

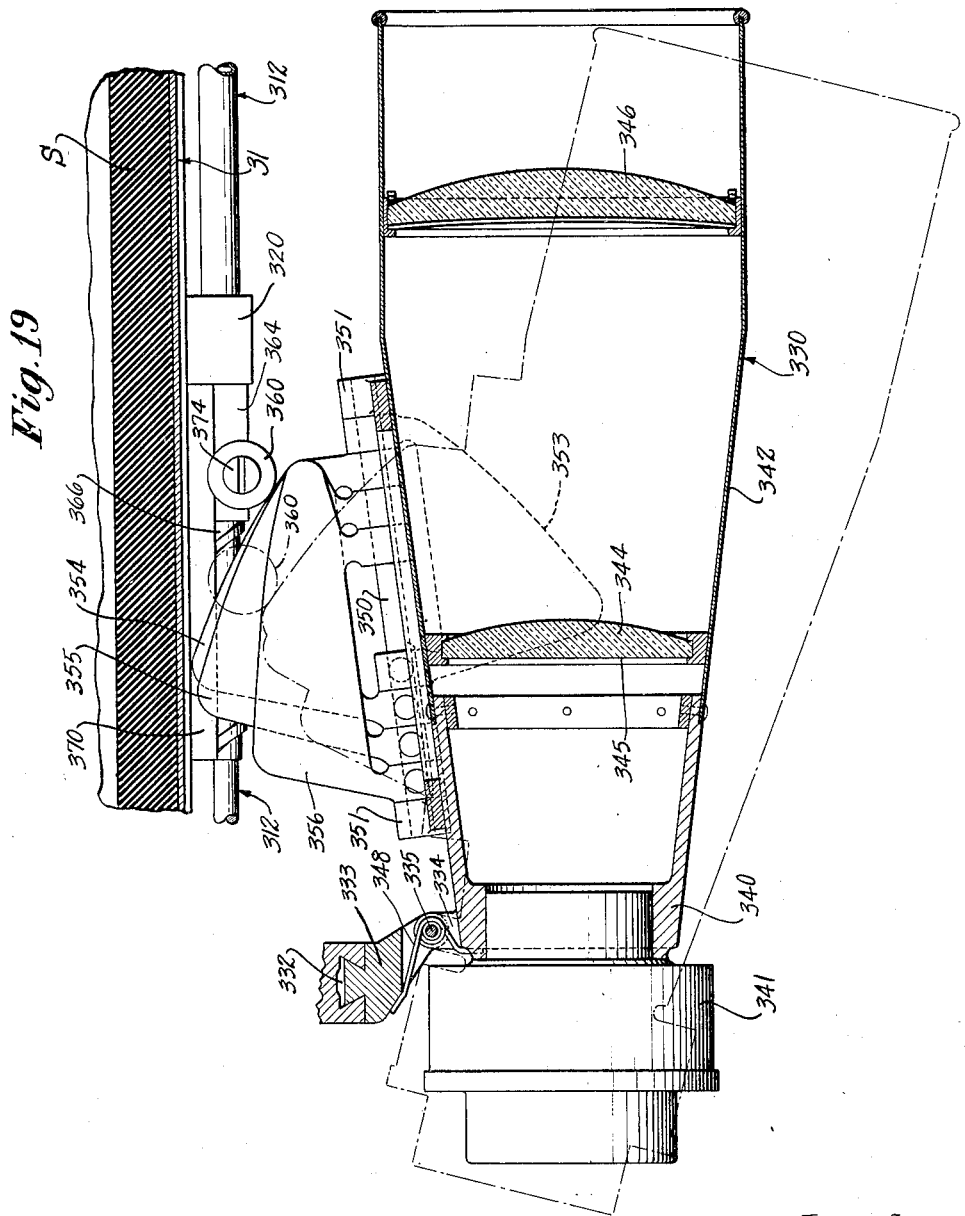

Patented Aug. 3, 1937

2,088,714

UNITED STATES PATENT OFFICE 2,088,714

SOUND INSULATED MOTION PICTURE CAMERA

George A. Mitchell, Los Angeles, Calif., assignor to Mitchell Camera Corporation, West Hollywood, Calif., a corporation of Delaware Application May 7, 1934, Serial No. 724,351
Renewed April 23, 1937

4 Claims. (Cl. 88—16.2)

This invention relates generally to motion picture cameras, and it may be stated as a general object of the invention to provide a sound insulated motion picture camera.

Since the advent of sound pictures it has become essential to silence the motion picture camera, since camera noises are readily picked up and recorded by the sound recording equipment. Attempts have been made to meet the problem by devising quiet camera mechanisms to take the place of the comparatively noisy mechanisms heretofore used, but at the best so far achieved the camera still produces considerably more than an acceptable minimum of noise. Accordingly, it has been common practice to enclose the entire camera within a comparatively large sound proof box. Such sound proof boxes have sometimes constituted booths, sufficiently large enough for the cameramen to enter to operate the camera, and in other cases are simply large boxes adapted to surround the camera.

It is a primary object of the present invention to provide a more compact sound insulated motion picture camera, the sound insulation parts of which are constructed as a component part of the camera structure.

It is a further object of the invention to provide a sound insulated motion picture camera in which the various usual manual control devices as well as focusing and view finding devices extend through or are mounted on the exterior of the insulated camera case.

A further object of the invention is to provide a particularly effective sound insulation medium, and a desirable and effective means of applying it to a camera housing.

A further object of the invention is to provide a special sound proof housing with an improved means for quickly and easily gaining access to the camera mechanism, and also to the film magazine for the purpose of changing film, or for the purpose of entirely removing the film magazine.

Various additional objects will appear from the following detailed description of a present preferred embodiment of the invention as applied to a particular motion picture camera, which will now best be set forth without further preliminary discussion, reference for this purpose being had to the accompanying drawings, in which:

Fig. 2 is a rear view of the camera seen in Fig. 1;

Fig. 3 is an elevation of the camera looking at the side opposite to that seen in Fig. 1;

Fig. 5 is a section taken on line 5—5 of Fig. 4;

Fig. 5a is a section taken on line 5a—5a of Fig. 5;

Fig. 7 is a section taken as indicated by the broken line 7—7 of Figs. 1 and 3, the interior camera box and magazine being shown in full elevation but with certain parts broken away;

Fig. 8 is a section taken as indicated by line 8—8 of Figs. 2 and 7;

Fig. 9 is a section taken as indicated by line 3a—3a of Fig. 2;

Fig. 10 is a view similar to that of Fig. 9 but showing the interior camera box moved to another position;

Fig. 11 is a sectional view taken as indicated by line 11—11 of Fig. 7;

Fig. 12 is a section taken on line 12—12 of Fig. 11;

Fig. 12a is a section taken on line 12a—12a of Fig. 11;

Fig. 13 is a section taken on line 13—13 of Fig. 11;

Fig. 14 is a section taken on line 14—14 of Fig. 12;

Fig. 15 is a section on the plane indicated by line 15—15 of Fig. 7;

Fig. 16 is an enlarged detail taken from Fig. 9;

Fig. 17 is a detail section taken on line 17—17 of Fig. 2;

Fig. 18 is a section taken on line 18—18 of Fig. 1; and

Fig. 19 is a section taken on line 19—19 of Fig. 18.

Figure 1:
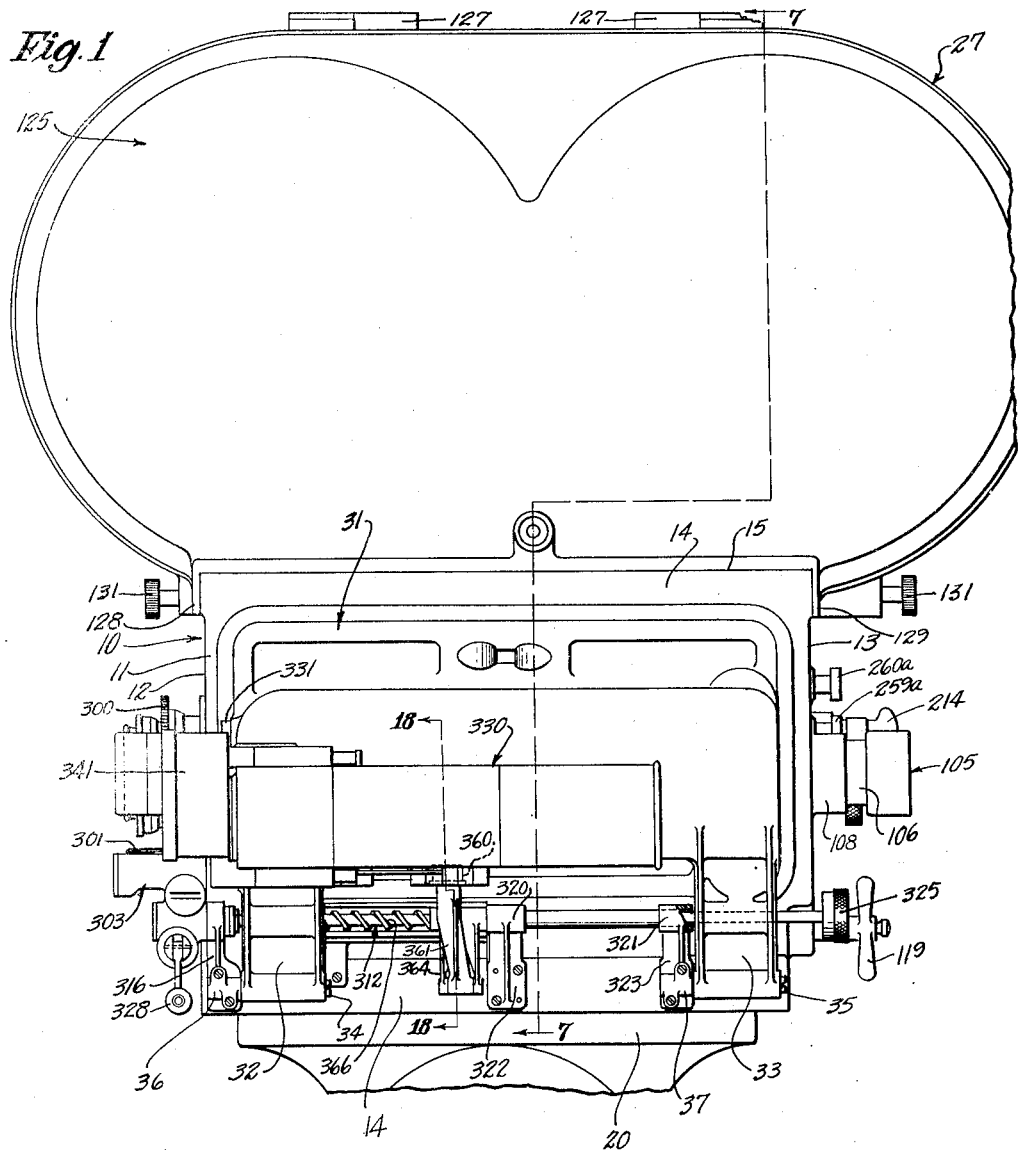
Fig. 1 is a side elevation of the sound insulated camera of the present invention.

The present invention is here illustrated in connection with the Mitchell type of motion picture camera, to which certain features of the present invention particularly relate. It is a characteristic of the Mitchell camera that its film mechanism, including a focusing instrument, shifts laterally behind the photographic lens; and certain aspects of the invention relate to the sound proof enclosure of that shifting type of camera. It will be understood, however, that this constitutes no limitation on certain other aspects of the invention, inasmuch as in certain aspects the invention is applicable to other types of cameras as well.

In the drawings, numeral 10 designates generally the exterior case of the sound insulated camera, this case comprising a box-like casting 11 including front and rear walls 12 and 13, respectively, vertical side wall 14, and top 15. A bed plate 16 closes the lower side of casing 11, engaging upwardly against lugs 18 within said casting and being fastened thereto by screws 19 (Figs. 7 and 8). This bed plate is adapted to rest on and be secured down to the head plate 20 of the tripod. The side of casting 11 opposite side 14 is closed by a removable side casting 21, shaped to fit around the camera motor M, and fastened in place by screws 22.

The top wall 15 of case 11 has a rectangular opening 25 through which extends the lower portion or throat of the usual camera magazine 26. A magazine compartment 27 is removably mounted on the top of case 11 around opening 25, and is of a size and shape to accommodate the camera magazine in two different positions, as will be more fully discussed hereinafter.

The side 14 of the housing is provided with an opening 30 (Fig. 7), which is closed by a downwardly swinging door 31, the latter provided with downwardly extending integrally formed arms 32 and 33 (Fig. 1) pivoted on pivot pins 34 and 35, respectively, which are respectively carried by mountings 36 and 37 affixed to side wall 14.

The entire case, swinging door, and magazine compartment, as thus described, is lined, except where certain parts project through the walls, with a layer of suitable sound insulating material S. This insulation may be of any suitable substance having the desired sound insulation qualities, although I prefer to form it as a molded layer of rubber, or rubber substitute, preferably of the same nature as those produced by sulphuretted oils. A well known example of such a material is ordinary "art gum". I have found that this substance may readily be molded into variously shaped forms adapted to fit the irregular conformations of the exterior camera case, and also that its sound insulation qualities are very marked, while at the same time deterioration of this material is negligible. Accordingly, a set of moldings is made of the chosen material, preferably of substantially uniform thickness, but of various outlines and shapes to fit accurately the inner surfaces of the various irregular walls of the case and magazine compartment. These individual moldings are cemented within the walls which they are formed to fit, such as typically indicated at 38 within housing door 31, and at 39 within side wall 21 (Fig. 7).

The operative motion picture camera mechanism, or camera proper, is mounted within this sound insulated case, which, as will subsequently appear, has been constructed of such a shape as to receive and closely conform to the outline of the camera mechanism, but to accommodate movement of certain components of the camera mechanism within the case.

The interior insulated camera structure will be seen (Figs. 8 and 15) to embody a horizontal base or bed plate 40, having rising from its forward end a vertical head portion 41, and a camera box or mechanism carrier 42 located to the rear of head 41 and arranged to slide transversely across bed 40 in ways 43. This box 42 carries all of the running gear of the camera.

Figure 3A:
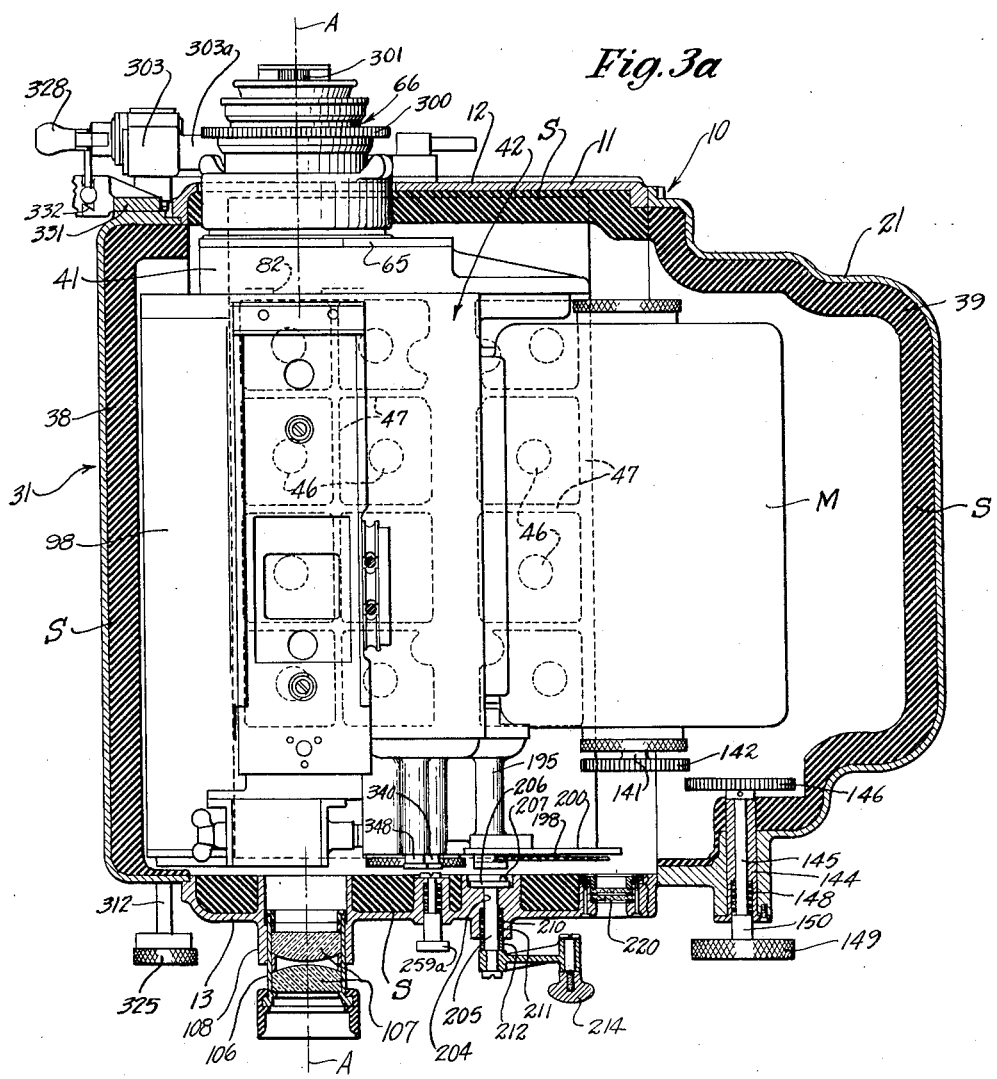
Fig. 3a is a section taken on line 3a—3a of Fig. 2, but showing the interior camera mechanism in plan.

Camera base 40 is supported on a molded insulation pad 45 of the described material, which rests on exterior housing bed plate 16. Bed plate 16 has spaced upwardly extending projections 46 which pad 45 is molded to fit (Figs. 7 and 8), this provision serving accurately to position the pad with reference to the housing, while camera base 40 has downwardly extending longitudinal and lateral ribs 47 forming squares around projections 46 (Fig. 3a) and adapted to be received within slots 48 molded in the upper side of the pad, as clearly shown. It will be obvious that this provision serves accurately to horizontally position the interior camera structure with reference to the exterior housing or case 10. The front and rear ends of base 40 have forwardly and rearwardly projecting supporting flanges 50 and 51, respectively, (Fig. 8) which rest down on pad 45, while the forward and rearward housing walls 12 and 13 have inwardly projecting flanges 53 and 54 which overlie plates 50 and 51, respectively. An insulation pad 55 is placed between 50 and 53, and an insulation pad 56 is placed between flanges 51 and 54, these pads being snugly fitted and serving to restrict the camera base against movement within case 10. Screws 58 and 59 at the front and rear pass upwardly through pad 45, extend through enlarged apertures 60 in flanges 50 and 51, and thence pass through pads 55 and 56 to screw thread into housing flanges 53 and 54, respectively. The heads of the screws, with washers, bear upwardly against pad 45, locally somewhat compressing it. These provisions serve accurately to position the interior camera structure and mechanism within the insulated housing, without the interior camera mechanism engaging in metal to metal contact with any metallic part of the housing.

The camera head 41 that rises from the forward end of base member 40 is hollow (Fig. 15) and houses certain mat devices, not necessary here to illustrate, and its forward side is closed by a plate 65 that carries the lens mount (see Figs. 5, 5a, 8 and 15). The camera here shown is of the type having a single photographic lens mount holder, which is adapted to removably receive lens mounts having lenses of different focal lengths, rather than of the other common type involving a rotatable lens turret carrying a plurality of lenses of various focal lengths; it will be obvious, however, that the present invention is adaptable to either type. The lens mount, generally designated at 66, is shown in Figs. 5 and 8 to be supported on wall 65 and to project through a circular opening 67 in housing wall 12 and the insulation pad immediately within that wall. The cylindrical outer barrel 70 of the lens mount is removably received within a supporting sleeve 71 formed integrally with the aforementioned wall 65, and is adapted to be removably clamped thereto through engagement of its lugs 70a by inwardly extending flange portions 72a of a clamping ring 72 screwthreaded on the exterior of sleeve 71 (Fig. 5a). Screwthreaded within barrel 70 is an inner barrel 74, while mounted within barrel 74 is a tube 75 and ring 76 which carry and position the lens tube assembly 77 which contains the photographic lens L and the usual iris, not shown. Rotation of barrel 74 causes said barrel and the photographic lens carried thereby to be screwed forwardly or rearwardly within outer barrel 70, and this operation is utilized to focus the lens. The means effecting such rotation of barrel 74 for focusing purposes will be described at a later point in the specification.

Immediately to the rear of the photographic lens and in alinement therewith there is formed in head 41 the usual photographic aperture, as indicated at 82 in Figs. 4, 7, 8 and 15, this aperture extending through the rear wall 65a of the hollow head.

The camera box 42 carries on its top the usual film magazine 26, which is detachably mounted on said box in any suitable manner. The magazine shown is of conventional type, embodying compartments 87 and 88 for the feed and take-up film rolls, respectively, which compartments are provided with circular lids 89 screwthreaded therein (see Figs. 7 and 8), said lids being removable for the purpose of loading or unloading the magazine with film. Throat 90 of the magazine, through which the film passes in entering and leaving camera box 42, rests on and is detachably secured to camera box 42 in any usual or suitable manner, as indicated in Figs. 7 and 8. The aperture 25 formed in the top of the exterior camera housing is preferably of such size as just to pass magazine throat 90, as shown in Figs. 7 and 8. Within each magazine compartment is a film-spool receiving spindle 92, which is journalled in and extends through the rear side of the magazine. The spindle 92 within the rearward or film receiving compartment 88 has on its outer end a pulley 94 adapted to be driven by a belt 95. Such a magazine is well known and need not here be further described.

Camera box or carrier 42 is adapted to carry the usual film guide rollers, sprockets and intermittent film movement mechanism, for intermittently moving the film F downwardly past aperture 82, in the focal plane of photographic lens L, these parts all being well known and requiring no present illustration. The driving motor M for the camera mechanism is also mounted on this frame or carrier 42 that carries the film mechanism, and therefore shifts with it during the described transverse shift on bed 40.

For the purpose of gaining access to the interior of camera box 42, the side of the camera box adjacent housing door 36 is provided with a door 96 (Fig. 8), hinged along its lower edge, as at 97. This camera box door 96 may be opened after housing door 31 has been swung down.

Mounted on the outside of camera box door 96, at the level of photographic aperture 82, is a focusing tube 98. The forward end of this focusing tube comes closely adjacent the rear surface of camera head 41 when camera box 42 is moved to the right on bed 40 (viewing the camera from the rear), and by such movement the forward open end, or focusing aperture, of the focusing tube is brought into register with photographic aperture 82 in head 41 and thus into alinement with photographic lens L. This is the focusing position of the camera box and focusing tube, and is indicated in Fig. 10. The focusing tube here illustrated carries a ground glass 100 which is in the focal plane of the photographic lens, and, when the camera box and focusing tube have been moved to the position last mentioned, namely, with the focusing tube registered with the photographic aperture 82 and lens, this ground glass occupies the position normally taken by the film. The focusing tube has an objective combination 101, collector 102 immediately to the rear of ground glass 100, and, in the rear end of tube 95, a collector 103. The eye piece for the focusing tube is not mounted in the usual manner in the rear end of the tube, but is mounted in the rear wall 13 of the exterior insulated housing, and is permanently located in a position in optical alinement with aperture 82 and the photographic lens (see Figs. 3a, 8, 9 and 10, where A—A designates the axis of the lens). The eye piece here shown comprises a tube 106 carrying lens 107, which is mounted to slide forwardly and rearwardly for adjustment purposes in a supporting sleeve 108 formed integrally with wall 13.

The camera box position indicated in Figs. 7 and 9 is the "take" position, with the film F within the camera box alined with aperture 82 and the photographic lens. In this position the focusing tube 95 is received within a pocket 110 (see Fig. 7) formed in housing door 31, and is out of alinement with its eye piece 105. When the camera box is moved over in ways 43 to the focusing position, with the focusing tube alined with aperture 82 and with its eye piece 105 in wall 13 (Fig. 10), then the ground glass of the focusing tube occupies the position previously occupied by the film, and receives the photographic image which will be formed on the film when the camera box is subsequently returned to the "taking" position of Figs. 7 and 9. When the box and focusing tube are in focusing position (Fig. 10), the image on the ground glass may be viewed, magnified, through eye piece 105 and the focusing tube, and at this time the photographic lens may be focused until the image appears sharp on the ground glass. The camera box is then shifted back to the position of Figs. 7 and 9 for "taking" and the image is sharp on the film.

Thus the focusing device is by the present invention divided into two parts, first, a focusing tube carried by the transversely movable camera carrier or box, and registerable with the stationary aperture and photographic lens, and second, an eye piece mounted in the rear wall of the exterior housing in permanent optical alinement with said aperture and lens. This provision of a stationary focusing-tube eye piece in permanent optical alinement with the photographic aperture permits the use of a tightly closed, insulated, exterior case about the shifting camera mechanism carrier and focusing tube.

For the purpose of shifting the camera box between the taking and focusing positions described, the underside of said box is provided with a pair of racks 116, with which mesh spur gears 117 which are mounted on a shaft 118 that extends outwardly through the rear wall 13 of the exterior housing, and has on its outer end an operating handle 119 (see Figs. 7 and 8). Rotation of this handle 119 causes gears 117 to act through racks 116 to shift the camera box from one position to the other.

As will be evident from Fig. 7, the magazine compartment 27 of the exterior housing is made of sufficient width to accommodate the magazine 26 mounted on the movable camera box 42 in both of the described positions of the camera box. Compartment 27 is divided longitudinally into two halves, 125 and 126, hinged together at the top, as at 127 (Fig. 7). The two halves rest down on top wall 15 of housing 11, and at their forward and rearward ends have downward flanges 128 and 129 (Fig. 8) which fit over the ends of said housing, in the manner clearly shown. Compartment half 126 is provided on its outer side with a hinged mounting 130 (Fig. 7) on housing top wall 15, and is secured down by means of screws 131 which pass through its projections 128 and 129 to screwthread into the adjacent walls of housing 11 (Fig. 8). The other compartment half 125 is provided on its side with a clamping screw 134 adapted to screwthread into an apertured lug 135 extending upwardly from housing wall 15.

When it is desired to change film in the magazine, screw 134 is loosened and compartment half 125 swung upwardly about its hinged connection 127 with the other compartment half 126. Magazine lids 89 may then be removed and the film changed. In case it is desired to remove magazine 26 from the camera, screws 131 are also loosened and compartment half 126 swung downwardly on its hinged mounting 130. This permits the belt 95 on the rear side of the magazine to be reached and removed and the magazine to be demounted in the usual manner. The hinged mounting 130 connecting compartment half 126 with housing wall 15 is here shown (Fig. 3) to embody a pair of hinge pins 138 rigidly supported by and projecting forwardly from mountings 139 affixed to the side wall of member 126, and corresponding bearings 140 for said pins mounted on top of wall 15. By swinging compartment half 126 to the right, as viewed from the rear of the camera, until its projections 128 and 129 clear the upper side of housing 11, the entire magazine compartment 27 may be removed from housing 11 by pulling it rearwardly until pins 138 disengage from bearings 140.

The side wall of magazine compartment half 126 is shown provided with a double-glass walled window 141 immediately opposite take-up reel pulley 94. The operation of the film take-up can be observed through this window.

The camera motor is designated at M, its housing being affixed to the side of camera box or carrier 42 (Figs. 7, 9 and 10). The camera motor accordingly shifts with the transverse movement of the carrier, and its two positions are shown in Figs. 9 and 10. Means are provided for manually rotating this camera motor from outside the camera housing, this means being operative, however, only when camera box 42 is in the "take" position. Journaled in a bearing 144 mounted in the rear end of side casting 21 is a motor operating shaft 145, having on its inner end a gear 146 which is adapted to be meshed with a gear 142 on motor shaft 141 when the camera box and the motor M are in the "taking" position of Fig. 9. Gear 146 may be moved into mesh with gear 142, when the parts are in that position, by moving shaft 145 inwardly through bearing 144 against a coil spring 148, spring 148 being placed around shaft 145 within a counterbore 148a in bearing 144, and acting against a collar 150 on shaft 145 to move the shaft in an outward direction. For the purpose of convenient operation of shaft 145, an operating knob 149 is mounted on its outer end. Shaft 145 and gear 146 thus normally take the extended position of Fig. 10, out of mesh with and entirely clearing gear 142. Gear 146 being in the position of Fig. 10, the camera box may be shifted over to focusing position without interference between gears 146 and 142, as will be obvious from Fig. 10. And when the camera box is in "taking" position (Fig. 9), knob 149 may be moved inwardly to engage gear 146 with gear 142, and may then be turned to manually rotate the motor shaft and thus to move the film. The motor is permanently in operative driving relation to the film; in fact it is a part of the film moving mechanism.

The other end of motor shaft 141 has a spiral gear 154 (Fig. 3), meshing with a spiral gear 155 on a transverse shaft 156 that drives the usual intermittent film movement mechanism (not shown). Shaft 156 also drives the shutter mechanism, and has for this purpose a spiral gear 157 (see Fig. 15) meshing with a spiral gear 158 which is mounted fast on the forward end of hollow shutter shaft 160. Shaft 160 is shown in Fig. 15 to be journaled in suitable bearings 161, 162 and 163 supported by camera box 42. On the extreme forward end of hollow shaft 160 is the usual shutter 166. Mounted to rotate within hollow shaft 160 is an inner shaft 167, and mounted on the forward end thereof is a shutter leaf 168.

These shutter members 166 and 168, which are of conventional form, will be understood to be mounted to rotate between photographic aperture 82 and the film within camera box 42, and to be adapted to take such a relative position as to provide substantially a 170° angular opening therebetween, so as to uncover the film for substantially 170° of rotation when shutter shafts 160 and 167 are rotated as one; or, are adapted by relative adjustive rotation of said shafts, to reduce the angular opening between the shutter members down to zero, or in other words to effect what is known as a dissolve. The means for controlling the dissolve mechanism within the shiftable camera box 42 are mounted on stationary camera case 10, and are connectible at the proper times with said dissolve mechanism. For the purpose of disclosing these connections and control means it will be necessary to discuss in some detail the dissolve mechanism.

Figs. 11 and 12 show the rearward ends of shutter shafts 160 and 167. Fastened on hollow shaft 160, immediately to the rear of camera box rearward wall 42a, is a gear sleeve 170, the forward end of which is formed as a worm 171, and the rearward end of which is journaled in a bearing 172 carried by a mounting casting 195 secured to camera carrier 42. The rearward end of inner shutter shaft 167 has a screw section 174, and mounted to work thereon is a nut member 175. This nut member 175 is fast within a sleeve 176 which slidably fits the bore of gear sleeve 170, and carries studs 177 which project outwardly through longitudinal slots 178 in sleeve 170. The outer ends of studs 177 engage in apertures 178a in a sleeve 179 which is slidably mounted on sleeve 170. This sleeve 179 is embraced at its ends by and is rotatable within a cylindric carrier 180, the lower side of which has a downwardly projecting gear portion or rack 181. This carrier member 180 is constrained against rotation by a way 182 formed in member 195 (Fig. 12) which receives and guides said gear projection 181 for longitudinal movement. Gear portion 181 is formed with spiral gear teeth, and the latter mesh with a spiral gear segment 185. Fast with this gear segment is a depending arm 186, to the lower end of which is pivoted one end of a link 187, the other end of which is pivoted to the lower end of a vertically movable rack 190 (Figs. 11, 12, 12a and 16). This rack 190, which is suitably supported and guided to move in a vertical direction, has on one edge rack teeth 191 which are constantly in mesh with a spur gear 192, which gear is fast on a rearwardly extending hollow shaft 193 journaled in mounted casting 195.

The rearward end of shaft 193 has an integrally formed head 196, having in its rearward surface an off-center aperture 197 (Figs. 10 and 7). Head 196 carries a pointer 198 which is adapted to move through substantially 170° of arc over a calibrated shutter-opening scale 199 inscribed on a plate 200 carried by mounting member 195. Journaled in and longitudinally slidable through a bore 204 in rear housing wall 13 is a shaft 205, the inner end of which carries a crank disc 206 having a crank pin 207, said crank disc and pin being adapted to be received within a countersink 208 formed in the inner surface of wall 13 (Fig. 10). Shaft 205 normally carries crank disc 206 and pin 207 in the latter position by reason of a coil spring 210 placed around said shaft in a counter bore 211 and which acts outwardly against a collar 212 on shaft 205. The exterior end of shaft 205 carries a manual operating crank 214.

Shaft 205 is so located in camera housing wall 13 as to be concentric with shaft 193 when the camera box 42 has been moved to "take" position (Fig. 9). Crank pin 207 on shaft 205 is so arranged that at a time when the camera box is in the position of Fig. 9, it may be drivingly engaged with aperture 197 by forcing crank 214 and shaft 205 inwardly against the force of spring 210 and turning the crank until the pin finds the aperture. This engagement having been made, turning of crank 214 causes rotation of shaft 193 and gear 192, thereby moving rack 190 up or down, depending upon the direction in which the crank is turned. Such movement of rack 190 acts through link 187 and arm 186 to rotate spiral gear segment 185, which in turn acts on spiral gear element 181 to cause longitudinal translation of carrier member 180. The rotating sleeve 179 embraced and carried by member 180 is thus caused to move longitudinally on gear sleeve 170, and in so doing acts through studs 178 to move nut member 176 forwardly or rearwardly within the bore of the gear sleeve. Since the nut member is constrained against relative rotation within the gear sleeve, this longitudinal movement of the nut member causes rotation of screw element 174 relative to gear sleeve 170, and consequently relative rotation of shaft 167 within hollow shaft 160. Thus by this operation the opening between the shutter members carried by the shutter shafts 160 and 167 may be varied between zero and 170°, and this control may obviously be effected while the camera is in full operation. The scale 199 which indicates the degrees of shutter opening is visible from outside the camera through an arcuate double glass walled window 220 in wall 13, with which the scale comes into register when the camera box is in the position of Fig. 9. The double glass is used in this window for the sake of added sound insulation. Preferably, the rear end of inner shutter shaft 167 and the rear end of gear sleeve 170 on hollow shutter shaft 160 are provided with shutter signal devices 222 and 223, respectively, (Figs. 7 and 11). Member 222 is a circular disk, one half of which is painted black to correspond with the shutter opening of the shutter on the forward end of shaft 160, while member 223, which may be painted black all over, is of the same shape as the shutter lead on the forward end of shaft 167. These shutter signal members register with a double glass walled window 225 in rear camera wall 13 when the camera mechanism is in the "take" position described, and indicate at a glance the positions of the two shutter members.

Thus when camera box 42 has been moved by operation of handle 119 to "taking position", the dissolve mechanism carried by said box comes into operative relation with a manual crank which is mounted in the rear exterior housing wall, and which may at that time be operatively engaged with the dissolve mechanism.

The dissolve mechanism also involves automatic devices for accomplishing the dissolve, which likewise register with control devices mounted in the rear camera case wall 13 when the camera box has been moved to the taking position illustrated in Fig. 9. The worm 171 on gear sleeve 170 meshes with worm gear 230 on a vertical shaft 231 (Figs. 11 and 12). Shaft 231 carries a spiral gear 232 which meshes with a spiral gear 233 on a stud shaft 234, said shaft 234 also carrying a spur gear 235. Gear 235 meshes with a spur gear 236, which in turn meshes with another spur gear 237 directly over it.

Gear 236 is mounted to rotate on the inner end of a shaft 240 which is mounted to reciprocate through a bore 241 in casting 195 (Figs. 9, 10 and 16). Movement of shaft 240 inwardly from the position shown in Fig. 9 engages gear 236 with gear teeth 242 on the edge of vertically movable rack 190 which is opposite to the previously mentioned rack teeth 191. Gears 235, 236 and 237 are of sufficient length relative to each other that gear 236 remains in mesh with the other two gears during such movement into mesh with the rack. It will be evident that when gear 236 is thus in mesh with rack gear teeth 242, the rack will be moved in a vertical direction, and will actuate the shutter dissolve mechanism in a manner similar to that effected when hand crank 214 is operated, as previously described. The rack is then being moved by power applied through the gear train from the rotating shutter shaft 160. The upper gear 237 is mounted on a shaft 245 (Fig. 11) which is longitudinally movable in casting 195, gear 237 having a peripheral groove 246 engaged by a fork 247 mounted on the inner end of a control shaft 248 which is mounted for longitudinal reciprocation through a bore 249 in casting 195. Inward movement of shaft 248 from the position shown in Fig. 11 causes gear 237 to move inwardly into engagement with the rack teeth 242 of rack 190, while remaining in mesh with its driving gear 236, and since gears 236 and 237 rotate in opposite directions, the rack is then moved in a direction opposite to that effected during the engagement of gear 236 with the rack, thus causing automatic operation of the dissolve mechanism in a sense opposite to that effected by engagement of gear 236 with the rack.

To prevent gears 236 and 237 from being engaged simultaneously with the rack, there is provided a safety guard in the form of a pivoted yoke 250 (Figs. 9, 13 and 16), the two arms of which have beveled ends 251 which engage conical surfaces 252 on shafts 240 and 248. The relative arrangement of the parts is such that in order for either of the two shafts to move inwardly to engage its gear with the rack, its conical surface 252 in engagement with the beveled end of the corresponding yoke arm must cause the yoke to swing to a position with the beveled end of its other arm moved into locking engagement with the inwardly inclined conical surface 252 of the other shaft. Thus but one of the two shafts can be moved inwardly at a time, inward movement of either one of the shafts positively locking the other against similar movement.

It has been said that gears 236 and 237 are moved into mesh with rack 190 by virtue of inward movement of shafts 240 or 248, respectively. These shafts are normally yieldingly held in a rearwardly retracted position by means of coil springs 253 and 254, respectively, (Figs. 9 and 11) placed around the shafts in counter bores 255 and 256, and acting outwardly on shaft collars 257 and 258 which work within said counter bores. The outer ends of shafts 240 and 248 are adapted to be actuated by actuating plungers 259 and 260, respectively (Figs. 9 and 17) which are mounted to reciprocate through bores 261 and 262 in rear housing wall 13, and are located in said wall in such positions that plungers 259 and 260 come into end to end register with shafts 240 and 248, respectively, when camera carrier 42 is moved to photographing position (Figs. 7, 9 and 17). The inner ends of plungers 259 and 260 have enlarged heads 261a and 262a, respectively, adapted to engage the adjacent ends of shafts 240 and 248, said heads being engageable against the inner surface of rear wall casting 13 to limit outward movement of the plungers. The plungers are normally yieldingly held in a position with heads 261a and 262a in such engagement with wall 13 (clearing the outer ends of shafts 240 and 248) by means of coil springs 263 and 264, respectively, placed around said plungers in counter bores 265 and 266, and acting outwardly against shaft collars 267 and 268 which work within said counter bores. On the outwardly projecting ends of plungers 259 and 260 are push buttons 259a and 260a, respectively. It will be evident that normally there is no interference between shafts 240 and 248, and their actuating plungers 259 and 260, so that the box or carrier member 42 is free of interference in its transverse shaft; but that, when carrier 42 is in photographing position (Fig. 9), either of the plungers, say 259, may be moved inwardly by pressure of the finger on push button 259a, until the inner end of said plunger engages the outer end of its corresponding shaft 240 and moves the latter inwardly to engage gear 236 with rack 190, with the previously described resulting operation of the dissolve mechanism. Upon release of push button 259a, both members 240 and 259 return to their normal rearwardly extended inoperative positions. Shaft 248 is similarly operated to engage gear 237 with the rack by pushing inwardly on push button 260a.

A means is preferably provided for normally locking the dissolve mechanism in such a way that relative rotation between the two shutter shafts cannot take place during normal operation of the camera. For this purpose there is provided a locking plunger 270 (see Figs. 9, 10, 14 and 16) which is mounted to reciprocate in a bearing 271, the latter extending through and being fastened to camera wall 42a in such disposition that the end of plunger 270 is immediately opposite the rear side of rack member 190. The forward end plunger 270 is provided with horizontally cut teeth 275 (Fig. 14), which are adapted to engage rack teeth 276 on the adjacent side of said rack. A coil spring 277 placed around plunger 270 and engaging a plunger shoulder 278 urges said plunger to move in a direction to engage its teeth 275 with rack teeth 276. It will be evident that such engagement positively locks rack 190 against vertical movement, and hence locks the entire dissolve mechanism adjustment means against operation. When the dissolve mechanism is to be operated, plunger 270 is withdrawn against spring 277 to disengage the rack for vertical movement. Plunger 270 carries for this purpose a plate 280, into one end of which is screwthreaded a push rod 281 which is reciprocable through the aforementioned hollow shaft 193 and projects normally a short distance beyond shaft head 196 (Fig. 10). When the parts are in the position of Fig. 9, and crank 214 is moved inwardly to engage crank pin 207 with aperture 197 for the purpose of accomplishing a manual dissolve, crank disc 206 engages the projecting end of push rod 281 and forces it inwardly, thereby moving plate 280 and locking plunger 270 to disengage said plunger with rack 190. The rack is thus freed for vertical movement, and manual crank 214 may be turned to accomplish the dissolve mechanism operation desired. When crank 214 is released, it moves outwardly under the influence of its spring 210, and so releases push rod 281 and plate 280 to move outwardly under the influence of locking plunger spring 277, which thereupon acts to move the locking plunger into engagement with the rack teeth to lock the dissolve mechanism against further shutter adjustment movement.

Locking plunger 270 is also moved inwardly to release the rack with inward movement of either shaft 240 or shaft 248 in meshing gears 236 or 237, respectively, with the rack. For this purpose shaft 240 has on its extreme inner end an extension 284 (Fig. 16) adapted to engage plate 280 during its inward movement to move said plate and locking plunger 270 inwardly to disengage the rack. For the same purpose, gear 237 which is moved inwardly into mesh with the rack through inward movement of shaft 248, is provided with a projection 286 (Fig. 11) adapted to engage and move plate 280 during such inward movement, and so cause disengagement of the locking plunger with the rack.

The focusing means for the photographic lens is mounted on exterior case 10. It has been described previously how rotation of lens mount barrel 74 within barrel 70 which it screwthreadedly engages causes forward or rearward focusing movement of the photographic lens which is carried by barrel 74. For the purpose of so rotating lens mount barrel 74, said barrel is provided with an integrally formed spur gear 300, which is adapted to mesh with a smaller spur gear 301 keyed on a shaft 302 which is journaled at its two ends in suitable bearings carried by a gear housing 303. Gear 301, the top of which projects outwardly through an opening in housing 303, is of sufficient length that the gear 300 on the longitudinally travelling lens mount will remain in mesh therewith in all positions of such longitudinal travel, as will be clear from Fig. 5.

Figure 6:
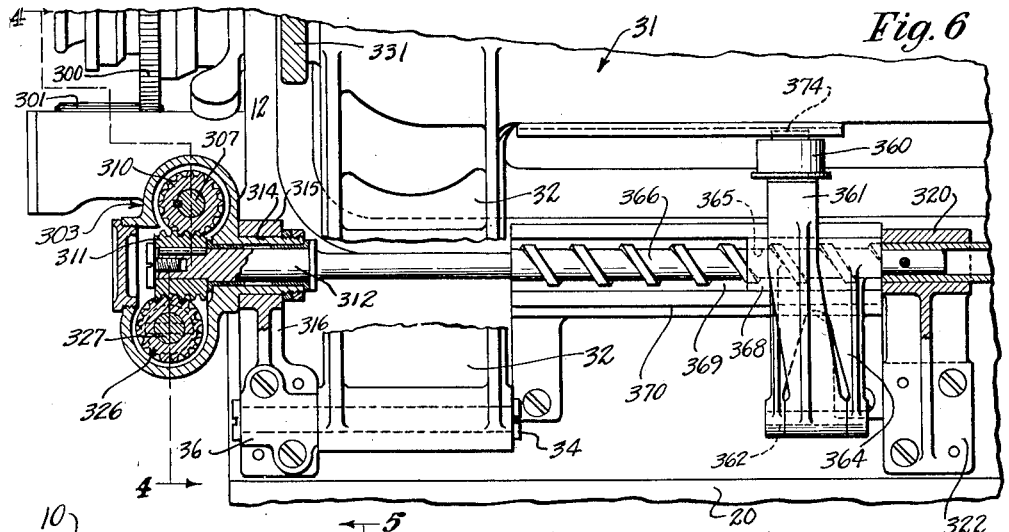
Fig. 6 is a detailed view of a portion of the side of the camera, the view finder device being removed, and certain parts being broken away to expose underlying parts.
Figure 4:
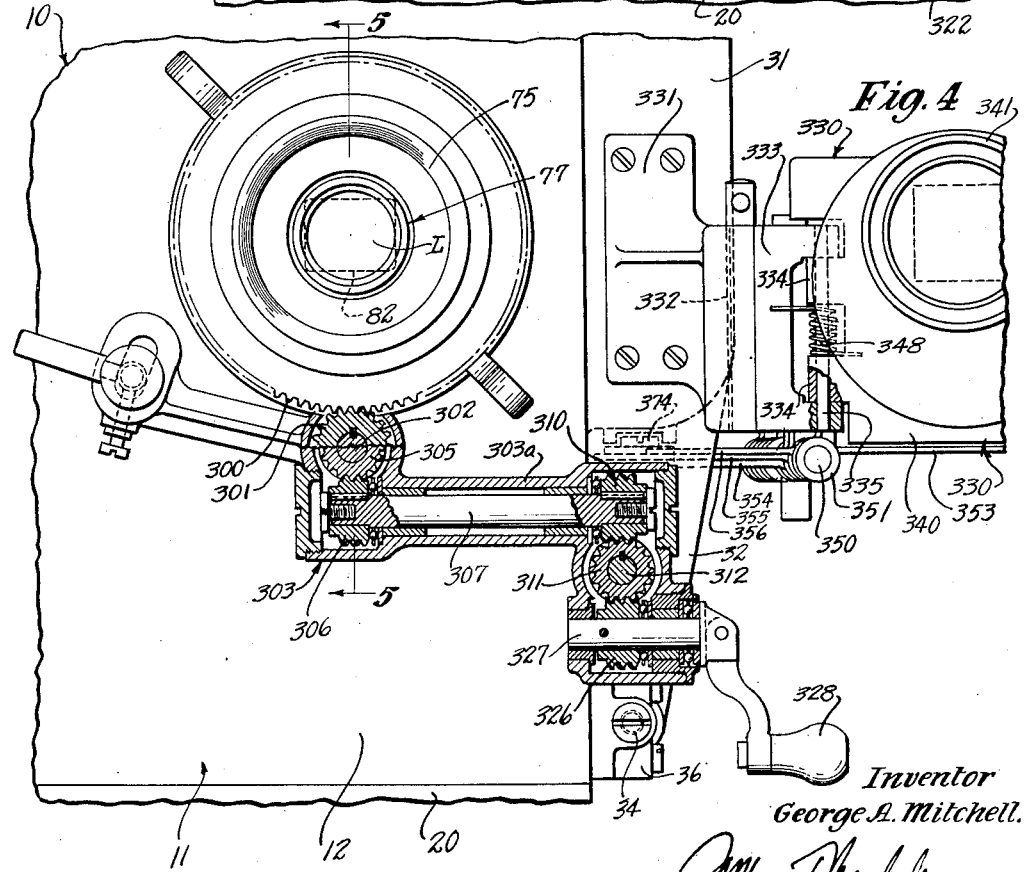
Fig. 4 is a view of a portion of the front end of the camera, being a view taken on line 4—4 of Fig. 6.

Pinned on shaft 302 immediately to the rear of gear 301 is a spiral gear 305 which meshes with a spiral gear 306 mounted on the end of a substantially horizontal shaft 307, the latter extending through and being mounted for rotation in a tubular section 303a of housing 303. Mounted on the end of shaft 307, just outside the plane of the side of camera case 10, is a spiral gear 310 which meshes with a spiral gear 311 mounted on the forward end of a horizontal longitudinally extending focusing shaft 312. The forward end of said shaft 312 is journaled within a concentric tubular extension 314 of housing 303, which extension is received within a bore 315 provided in the upper end of a supporting bracket 316 which extends upwardly from the mounting 36 affixed to case 10 (Fig. 6).

Shaft 312 extends along the side of the camera case 10, below the bulge of camera case door 31, (Figs. 1 and 6) and between door arms 32 and 33 and camera case wall 14 (Fig. 18). The shaft is supported by means of bearings 320 and 321, bearing 320 being mounted on a bracket 322 secured to casing wall 14, and bearing 321 being mounted on a bracket 323 formed integrally with the aforementioned shaft mounting 37.

On the rear end of shaft 312 is mounted a manual operating knob 325, by means of which said shaft may be rotated and the described gear train leading to the lens mount operated accordingly. As a means for focusing the lens from the front end of the camera, there is provided a spiral gear 326 in mesh with focusing shaft gear 311 (Fig. 4), which is on a shaft 327 operable by a manual crank 328.

The view finder for the camera is shown at 330, and is mounted on camera case door 31. An automatic finder parallax adjustment device is associated with and operated by the focusing mechanism described immediately preceding. A view finder carrying bracket 331 is mounted on camera case door 31 (see Figs. 4 and 19), and removably interfitted therein, as by means of vertical dovetail way 332, is a view finder mounting member 333. This mounting member 333 is in the form of a yoke and receives a pair of vertically spaced finder lugs 334 (Fig. 4), a pivot pin 335 extending downwardly through the yoke arms and lugs 334. The view finder swings for its parallax adjustment on this pivot pin 335.

The lugs 334 through which the finder is pivotally mounted to swing on pin 335 are formed on one side of finder head casting 340, the forward end of which carries the view finder objective mounting 341. Secured to the rear end of casting 340 is the rearwardly extending finder casting 342, which is rectangular in cross section (Fig. 18), and diverges somewhat rearwardly, (Fig. 19). The finder casing forms with casting 340 a light conduit from the objective 341 to the rear open end of the casing. The casing carries suitable optical elements, as a collector lens 344 having a ground glass surface 345 at the proper distance back of the objective, and a second collector lens 346 back of lens 344.

A coil torsion spring 348 is placed around finder mounting pivot pin 335, with one end bearing against finder mounting member 333 and the other bearing against finder head casting 340 (see Figs. 4 and 19), said spring being so arranged as to urge the finder body to swing inwardly about pivot 335 towards the camera case.

Means are then provided for moving the finder body outwardly, in opposition to this spring, in accordance with operation of the camera lens focusing means. For this purpose an operative interconnection is provided between the manual focusing shaft 312 and the finder body, this interconnection embodying a series of selective camming elements, each of which corresponds to a camera lens of given focal length.

Mounted on the finder body is a horizontal cam carrying shaft 350 (Figs. 18 and 19), said shaft being fitted non-rotatably in mountings 351 affixed to the finder casing. The several cams, designated at 353, 354, 355, and 356, are then rotatably mounted on this shaft 350, each cam being in the form of a flat plate having a curved outer camming edge. It will be observed from Fig. 18 that the several cam plates extend outwardly from their hubs at different elevations with reference to the hub axis, so that the cam plates may all be moved to the horizontal extended operative position together and will lie flat together, one above the other, in that position. In the position shown in the drawings cam plates 354, 355, and 356 are in this extended position, while the cam plate 353, which would be lowermost when moved to such an extended position, is shown rotated through 180°, to the inoperative position, adjacent the lower side of the finder body. It will be obvious that cams 354, 355 and 356 are likewise movable in succession to a similar inoperative position.

The outer operative edge of each cam plate is curved in accordance with the focal length of the lens with which that cam is to be used. It will be observed that the several cams 353, 354, 355, and 356 are of progressively decreasing width. A movable cam actuating member 360 is provided to operate on the curved cam edges, and it will be obvious that said member will be enabled to engage the cam edge of only the lowermost cam in any given case, since all cam plates above are always of narrower width. Accordingly, to select any cam for use, that cam and all cams above it are placed in the outwardly extended position, while all cams below are folded down and under the cam body to the inoperative position, as taken by cam 353 in Figs. 18 and 19.

The cam actuating member 360 is in form of a roller, and is adapted to be moved longitudinally of the camera and to engage and operate on the curved outer edges of the cam plates.

This roller is mounted for rotation on the upper end of a carrying arm 361, which is pivotally mounted at its lower end on a pivot pin 362 which is coaxial with the pivot axis of door arms 32 and 33. This pin is mounted on a carrier plate 364, the upper end of which has a screwthreaded bore 365 (Fig. 18) which works on a screwthreaded section 366 of focusing shaft 312. Carrier member 364 is formed with a slide plate 368 which is slidable in a longitudinally extending way 369 formed in a guide plate 370 secured against camera case wall 14. Arm 361 has a flat surface 371 which is adapted to engage a flat surface 372 on carrier member 364 when said arm is in the position of Fig. 18, the arm being held in such engagement by the action of the finder mounting spring 348 which urges the finder and cams carried thereby to press arm 361 against carrier 364. The head of the screw 374 that secures cam rollers 360 on the upper end of arms 361 is received within a longitudinal way 375 formed in a guide strip 376 secured to door 31, and moves in this way as arm 361 moves with carrier 364 to move roller 360 along the cam plates. When camera case door 31 is swung downwardly on pivots 34 and 35, this strip 375 engages the head of screw 374 and so causes arm 361 to swing downwardly on its pivot 362, which is concentric with the door pivot. Thus the camera case door 31, finder, and finder actuating roller arm 361 all swing down together on a single pivot axis, while the arm carrier 364 remains stationary.

It will now be evident that the rotatable focusing shaft acts as a lead screw to move carrier 364 and arm 361 forwardly or rearwardly as the shaft is turned in one direction or the other, and that the cam actuator 360 carried thereby acts on the curved outer edge of the selected finder cam to swing the finder on its pivot 335 in accordance with the characteristics of that cam. It will be understood, of course, that the screwthreads between the focusing shaft and the cam roller arm carrier are so arranged that the cam roller moves towards the front end of the camera as the lens is moved forwardly to shorten the distance of focus, and that each cam is designed in accordance with a lens of given focal length, so that by selection of the proper cam for a lens of given focal length in the camera, the finder will automatically be caused to swing, as the focusing shaft is rotated, in such a manner as to maintain the point intersection of its axis with the optical axis of the camera lens always at the distance at which said camera lens if focused.

Reference is here made to my copending application entitled View finder parallax and photographic lens focusing mechanism for motion picture camera, filed March 16, 1934, Ser. No. 715,838, in which the above described focusing and finder parallax adjustment means are claimed. Certain features of the dissolve mechanism as here disclosed are claimed in a copending application, Shutter dissolve mechanism, filed May 5, 1934, Ser. No. 724,193, and certain herein disclosed control devices for a shutter dissolve mechanism are claimed in a copending, divisional application entitled Shutter dissolve mechanism, filed December 7, 1935, Ser. No. 53,380. Claims to those means and mechanisms, in themselves and regardless of the type of camera, are made in said co-pending applications. In this application such means and mechanisms enter only as typical elements of the whole combination that makes up the complete sound proofed camera.

From what has now been said it will be seen that I have provided a complete sound insulated motion picture camera, characterized by extreme compactness, and by convenience and facility of adjustment, operation and control. The sound insulated exterior case of the camera has been designed to support the interior camera mechanism at the bottom through sound insulation material, and its various walls are lined with a layer of sound insulation material and are of such conformation that said layer closely approaches the interior camera mechanism at the sides and top, without actually touching it, being shaped, however, to accommodate movement of certain components of the camera mechanism. The air space between the camera mechanism and the layer of insulation material serves to minimize transference of mechanism vibrations to the exterior case, and thus lessens possibility of noise from that source.

The exterior case embodies a separate magazine compartment, which is adapted to be easily opened up to reach the inner film magazine without the necessity of opening the entire exterior camera case. This provision is of obvious advantage.

The rear wall of the exterior case permanently carries certain optical viewing and mechanical control devices which are cooperable, in certain positions of the interior shiftable camera mechanism box or carrier, with corresponding devices and mechanisms located on said shiftable carrier. Thus the devices which are mounted on said shiftable carrier are operable and manually controllable from outside the closed sound insulated case in which the carrier moves. The camera lens focusing mechanism, and the finder and finder parallax adjustment means, are mounted permanently on the outside of the exterior case of the camera.

It will thus be seen that I have provided a unitary and compact sound insulated camera, which is to be distinguished from the large sound proof boxes which have heretofore been placed around conventional cameras, and which have been so heavy and cumbersome as to require specially designed tripods to carry their weight. The present camera is of over-all dimensions but slightly larger than the conventional camera, and of but little increased weight, therefore requiring for its support nothing more than the usual standard tripod.

It will be understood the drawings and description are to be considered merely as illustrative of and not restrictive on the broader claims appended hereto, for various changes in design, structure and arrangement may be made without departing from the spirit and scope of said claims.

I claim:

1. A sound insulated motion picture camera, comprising a closed exterior box-like case, an interior camera mechanism, an insulation base pad on the inside surface of the lower wall of said case supporting the lower side of the camera mechanism, horizontal projections extending outwardly from the ends of the camera mechanism, horizontal projections extending inwardly from the camera case overlying said last mentioned projections, pads of sound insulation material fitted tightly between the pairs of projections at the two ends of the case, and screws at the two ends of the case passing upwardly through the insulation base pad, the camera mechanism and case projections, and the insulation pads lying between said projections.

2. A sound insulated motion picture camera, comprising a closed exterior case, an interior camera structure positioned within said case embodying a stationary frame and a mechanism carrier member transversely shiftable on said frame, sound insulation material between said case and said camera structure, a drive motor on said carrier member, a rearwardly extending drive shaft for said motor, a gear on said shaft, a reciprocable manual drive shaft extending through the rear wall of the exterior case, a gear on the inner end of said shaft adapted to mesh with the first mentioned gear when the carrier member is in one position, said manual drive shaft being retractable rearwardly to disengage said gear to permit the carrier member to be shifted transversely, and spring means yieldingly urging said manual drive shaft toward retracted position.

3. A sound insulated motion picture camera, comprising a closed exterior box-like case, an interior camera mechanism, an insulation base pad supported by the lower wall of said case and supporting the lower side of the camera mechanism, horizontal outwardly extending flanges on the lower portion of the camera, said flanges overlying marginal portions of the insulation base pad, horizontal inwardly extending flanges on the exterior case overlying said last mentioned flanges, pads of sound insulation material fitted tightly between the pairs of upper and lower flanges, and means clamping together said marginal portions of the insulation base pad and said inwardly extending camera case flanges.

4. In a motion picture camera comprising a closed sound insulated case, the combination of a camera mechanism within the case laterally shiftable therein from one position to another, said camera mechanism including a manually actuatable instrumentality, an actuating device for said instrumentality mounted in an exterior wall of the closed sound insulated case and operatively connectible with said instrumentality when in one of its positions, said actuating device comprising a shaft mounted for reciprocation through said exterior wall on a line at right angles to the direction of lateral shifting movement of said camera mechanism, the inner portion of said shaft being adapted for operative cooperation with said instrumentality when the shaft is moved inwardly through said exterior wall, and the shaft being movable in an outward direction to a retracted position to clear the camera mechanism for its lateral shifting movement at right angles to the direction of retractive movement of said shaft.

GEORGE A. MITCHELL.